United States Patent [19]
Joseph

[11] Patent Number: 5,541,461
[45] Date of Patent: Jul. 30, 1996

[54] ELECTRICAL CONNECTORS FOR SMALL ELECTRICAL APPLIANCES USING FRACTIONAL HORSEPOWER MOTORS

[75] Inventor: Mark Joseph, Monticello, Ind.

[73] Assignee: Uppco Incorporated, Monticello, Ind.

[21] Appl. No.: 188,576

[22] Filed: Jan. 28, 1994

[51] Int. Cl.⁶ .......................... H02K 11/00; H02K 3/00; H02K 3/46
[52] U.S. Cl. ............................... 310/71; 310/194
[58] Field of Search ................ 310/43, 71, 194; 336/192, 198

[56] References Cited

U.S. PATENT DOCUMENTS

| | | | |
|---|---|---|---|
| 3,553,621 | 1/1971 | Lane | 336/198 |
| 3,800,172 | 3/1974 | Arlin et al. | 310/71 |
| 3,939,362 | 2/1976 | Grimes et al. | 336/198 |
| 3,959,675 | 5/1976 | Laufner et al. | 310/194 |
| 3,974,407 | 8/1976 | Dochteman | 310/71 |
| 4,661,792 | 4/1987 | Watkins | 336/198 |
| 4,689,023 | 8/1987 | Strong, III et al. | 310/71 |
| 4,701,830 | 10/1987 | Kato et al. | 336/208 |
| 4,939,623 | 7/1990 | Equi et al. | 336/198 |
| 5,184,105 | 2/1993 | Endo | 336/198 |
| 5,200,731 | 4/1993 | Tochio et al. | 336/198 |

FOREIGN PATENT DOCUMENTS

| | | | |
|---|---|---|---|
| 2205255 | 9/1972 | France | 310/71 |
| 3813118 | 10/1989 | Germany | 336/208 |
| 1243690 | 8/1971 | United Kingdom | 336/208 |

*Primary Examiner*—Clayton E. LaBalle
*Attorney, Agent, or Firm*—Laff, Whitesel, Conte & Saret, Ltd.

[57] ABSTRACT

A winding is mounted on a molded plastic bobbin especially—but not exclusively—for use in a fractional housepower motor. A number of connector sites are molded in and along an exposed surface of the flange of the bobbin. Therefore, the flange acts as a power distribution panel for the fractional horse power motor and accessories associated therewith. The connector sites may be programmed in any convenient manner by electrical interconnections between the connector sites. The invention reduces manufacturing costs, saves space inside a small appliance housing, and reduces or eliminates floating wires and connection which might cause a failure in the field.

11 Claims, 2 Drawing Sheets

ELECTRICAL CONNECTORS FOR SMALL ELECTRICAL APPLIANCES USING FRACTIONAL HORSEPOWER MOTORS

This invention relates to small electrical appliances and more particularly to means for and methods of providing for a greater number of features on such appliances, especially by making a greater number of power connections available without adding significantly to the bulk of components inside the appliance housing.

This invention relates primarily to small electrical appliances of a type that uses fractional horse power motors. Electric fans, hair dryers, vibrators, massagers, toys games, and exercise devices are examples of such appliances. The list could be enlarged greatly.

At one time, the only electrical things inside an appliance housing were an on/off switch and the fractional horse power motor. The power cord entered the housing where either one or both wires were connected directly to the switch. Then, a wire or the wires were connected from the switch to the motor. This required more than a necessary amount of space in the housing and increased the cost of production by adding to the required labor. Wire connections were made by tape wrapped solder joints, wire nuts, compression connected terminals, or a combination thereof, which were bulky and difficult to install within a small space. Often this left loose or floating wires which might vibrate, fatigue wires or cause other problems at some future date.

Today, the trend is to reduce the size of appliances and to increase the number of features on them. Among the more simple of these features might be pilot lamps, heating elements, or liquid crystal or other electronic displays. Other features could include an addition of microprocessors, timers, surge protectors, or the like. The structure for providing all of these and other features is hereinafter called "accessories". Most of these accessories require power connections. Other of the accessories might require space inside the appliance housing for such things as batteries, electronic components, or the like, for example. The appliance can no longer afford the wasteful use of space occupied by wire nuts or other conventional connectors which both take up space and add labor costs.

Accordingly, an object of the invention is to provide means for and methods of improving small electrical appliances. Here, an object is to provide an array of power connections which can be made at almost no sacrifice of in-housing space and with little or no added costs, especially labor costs.

Yet another object of the invention is to provide fractional horsepower motors with greater flexibility so that they are adapted to be used without modification in a greater variety environments. Here, an object is to provide a more versatile bobbin for the motor winding which may find use as a piecepart in any of many different machines.

In keeping with an aspect of this invention, a bobbin especially—but not exclusively—for use in a fractional horse-power motor, includes a molded plastic spool or similar piecepart, with end flanges. At the time of molding, either sites or contacts for making a plurality of power connections are formed in one or both bobbin flanges. If only sites (e.g. recesses) are provided in the molded flange, contacts or a row of contacts are pressed into the recesses. If the contacts themselves are molded into the plastic, they may be interconnected within the plastic to provide a program of connections. The bobbin wire may be connected to these contacts in any suitable manner.

In any event, when the power cord is brought into the housing, it is plugged into a set of the contacts on the bobbin flange. A suitable switch, pilot lamp, or other devices requiring connections for power are also plugged into appropriate contacts on the bobbin flange. Depending upon the internal connections between the sets of contacts, one, many, or all contacts may be switch controlled. This way the bobbin flange serves as a mini-power distribution frame.

A preferred embodiment is shown in the attached drawings, in which.

Figure 1:
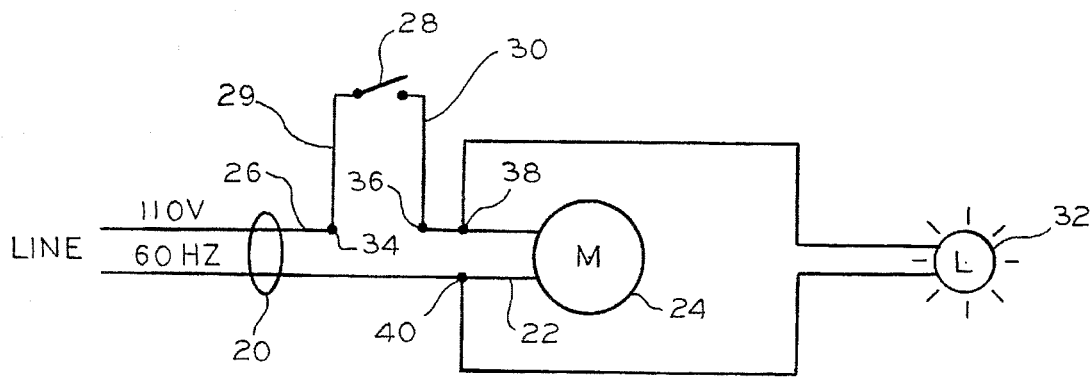
FIG. 1 is a schematic circuit diagram showing a conventional power connection.

In FIG. 1, the conventional circuit brings a power cord 20 into a small appliance housing where one wire 22 is connected directly to one side of the winding of a motor 24 and the other wire 26 is connected to a switch 28. Often, a separate wire 29 extends from the power cord 20 to the switch. Another wire 30 extends from the switch 28 to the other side of the winding of motor 24. If a pilot lamp 32 is provided, it may be connected to the power line at either side of switch 28. Again, the pilot lamp usually has its own separate wires. Lamp 32 is here shown connected to wires 22, 30 so that the pilot lamp is lit when ever the motor winding is energized via switch 28. If any other devices are provided, they may be connected to the power line in a manner similar to the connection of pilot lamp 32.

Each of the heavily inked dots 34–40 in FIG. 1 represents a connection that may be made with a soldered connection, a wire nut a crimped connector or the like. These connections take up space within the housing, require relatively high labor costs to complete, and provide a source of potential failure. Therefore, the appliance housing is larger than it has to be and the manufacture of the appliance costs more than it has to cost.

Figure 2:
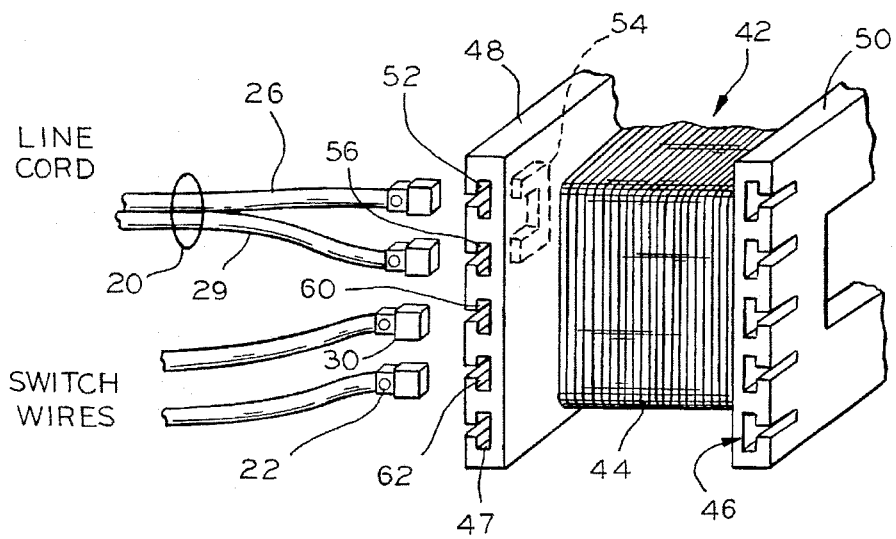
FIG. 2 shows a inventive bobbin with terminal connections.

FIG. 2 shows a fragment of the bobbin 42 that forms and supports the winding 44 of the motor. Generally, it is molded from a plastic, such as nylon, for example. As here shown by way of example only there are ten jack terminals connector areas (one of which is numbered 47) that are molded into the bobbin flanges 48, 50. Each connector area such as 46, 47 may contain a set of electrical contacts, which may be either inserted into the molded connector areas or entirely molded within in the flange walls. Or, there could be a combination wherein embedded wires are molded within the plastic forming the bobbin flange and, other the electrical connectors are inserted through molded socket areas 46, 47 and over the embedded wire.

Regardless of how the structure is constructed, preferably, at least some of the electrical connectors in the molded areas are electrically connected together. Or, they could be arranged according to the particular one of the flanges 48, 50 on which they appear. Therefore, if a connector is inserted into anyone of the connector areas, such as areas 46, 47, that wire is electrically connected to whatever is also connected to that area.

In general, a preferred embodiment of the invention might have a strip or strips of beryllium copper contacts, stamped in a predetermined pattern, and inserted into or molded in the slots such as 46, 47 to establish a program of connections. These contacts could be constructed to receive anyone of the well known terminals, such as spade, "pokein", siamese, or insulation displacement terminals, for example. Also, the terminals may be coded by size or shape so that wrong connections can not be made. For example, 110 v. power line connections may be slots to receive spade terminals about a quarter wide while 9 v. electronic devices may be connected to other areas via another type of terminal which is an eighth of an inch wide. The wider terminal may fit into a thin hole, so that a narrow thick terminal can not be fitted into the same hole.

Thus, for example, a terminal on one wire 26 of the power line 20 could be inserted into a first slot 52 and a terminal on one wire 29 of a switch 28 could be inserted into an adjacent slot 56. The beryllium copper contacts 54 made from a single piece of metal, may be molded into the flange or inserted into slots 52 and 56, thereby interconnecting terminals on the wires 26, 29 plugged into those slots.

A second switch wire 30 could be inserted into slot 60, to make a connection with one end of winding 44, for example. Again, if desired, a single beryllium copper contact, or the like, may interconnect slots 60, 62 in order to interconnect wire 30 and one end of winding 44. The other side 22 of the power line and the other end of winding 44 could be connected into a single terminal in slot 47. A number of similar terminal areas 46 may be formed on bobbin flange 50. The areas may serve any convenient purpose, such as providing connections to another voltage, such as 9 volts, D.C., for example.

Figure 3:
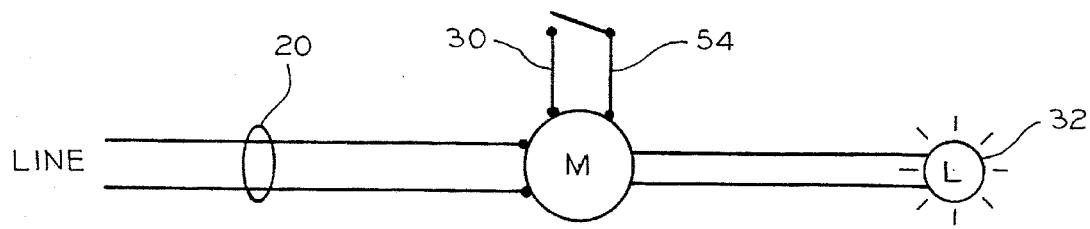
FIG. 3 illustrates a use of the invention in a circuit corresponding to that of FIG. 1.

FIG. 3 is a schematic circuit diagram which illustrates the clean and neat arrangement which is achieved by the invention. The circuit of FIG. 3 does everything that the circuit of FIG. 1 does without requiring a clutter of solder joints, wire nuts, crimped connectors, or the links, and without leaving a number of unsupported or loose wires to vibrate and become fatigued.

Figure 4:
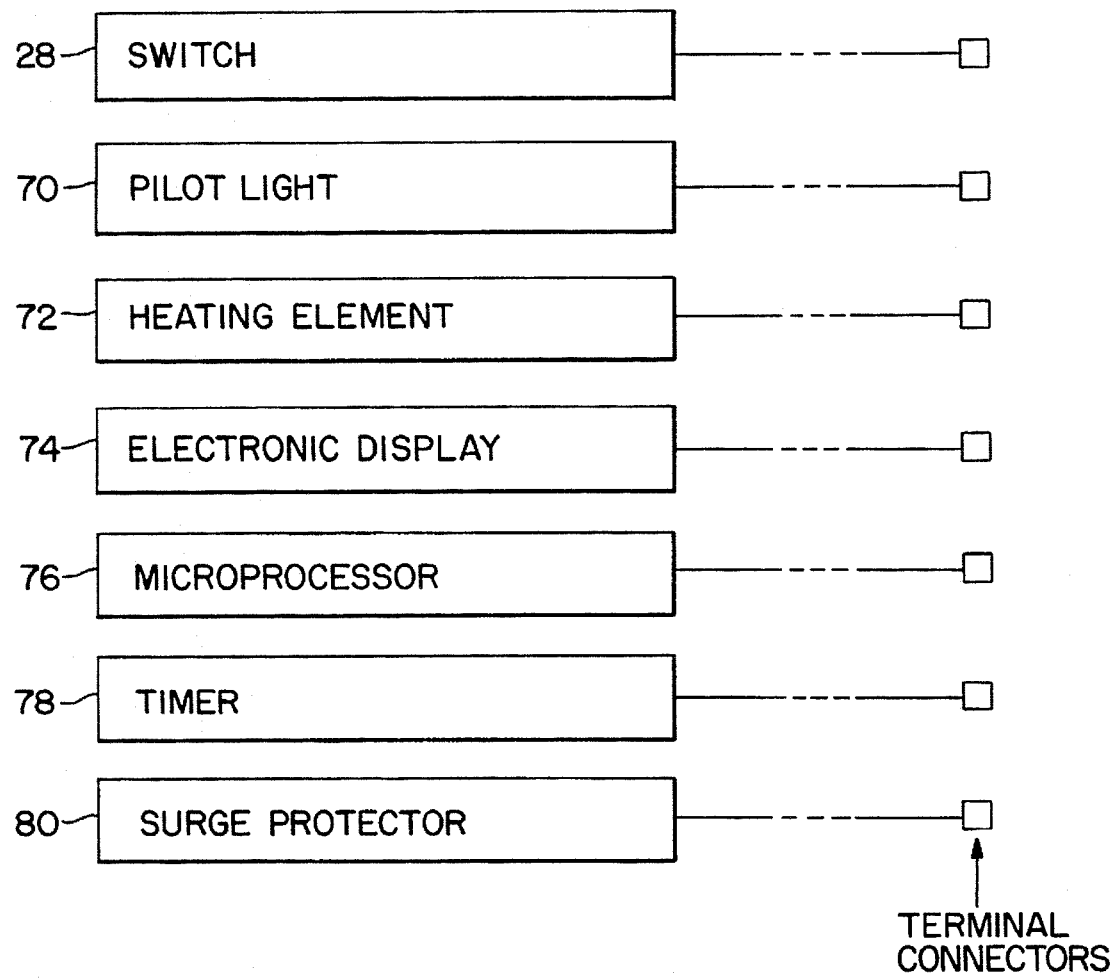
FIG. 4 is a chart showing an exemplary collection of devices which might plug into the terminals on the inventive bobbin.

FIG. 4 is a chart which illustrates any of a plurality of accessories which may be plugged into the connector areas, such as 46 and 47 on the bobbin flanges. Here, the exemplary accessories are a group including a switch 28, pilot lamp 70, heating element 72, electronic display 74, microprocessor 76, timer 78, and surge protector 80. Other suitable accessories could also be shown.

Those who are skilled in the art will readily perceive how to modify the invention. Therefore, the appended claims are to be construed to cover all equivalent structures which fall within the true scope and spirit of the invention.

The claimed invention is:

1. A plastic bobbin for supporting a winding mounted on said plastic bobbin having a plurality of conventionally shaped terminal receiving slots molded therein, and a plurality of conventionally shaped electrical contacts mounted in said slots for receiving and making electrical contact with conventional plug-in terminals on wires of associated equipment, a contact in at least one of said slots providing a connection for serving an appliance or accessory associated with said equipment, said slots forming a plug-in terminal strip for distributing electrical energy.

2. The bobbin of claim 1 wherein said bobbin supports a winding for a fractional horse power motor, said bobbin having at least one end flange and said slots are formed along an edge of said at least one end flanges to provide said terminal strip.

3. A plastic bobbin for supporting a winding mounted on said plastic bobbin having a plurality of conventionally shaped terminal receiving slots molded therein, and a plurality of conventionally shaped electrical contacts mounted in said slots for receiving and making electrical contact with conventional plug-in terminals on wires of associated equipment, a contact in at least one of said slots providing a connection for serving an appliance or accessory associated with said equipment, said slots forming a plug-in terminal strip for distributing electrical energy, wherein said electrical contacts are jack terminals mounted in said slots, said jack terminals being shaped to electrically interconnect selected ones of said slots in a manner which distributes said electrical energy according to a predetermined plan.

4. A plastic bobbin for supporting a winding mounted on said plastic bobbin having a plurality of conventionally shaped terminal receiving slots molded therein, and a plurality of conventionally shaped electrical contacts mounted in said slots for receiving and making electrical contact with conventional plug-in terminals on wires of associated equipment, a contact in at least one of said slots providing a connection for serving an appliance or accessory associated with said equipment, said slots forming a plug-in terminal strip for distributing electrical energy, wherein a contact in at least one of said slots is associated with a switch and a contact in at least one other of said slots is controlled by said switch.

5. A plastic bobbin for supporting a winding mounted on said plastic bobbin having plurality of conventionally shaped terminal receiving slots molded therein, and a plurality of conventionally shaped electrical contacts mounted in said slots for receiving and making electrical contact with conventional plug-in terminals on wires of associated equipment, a contact in at least one of said slots providing a connection for serving an appliance or accessory associated with said equipment, said slots forming a plug-in terminal strip for distributing electrical energy, wherein said contacts mounted in said slots are molded in said flange.

6. The bobbin of claim 5 wherein said contacts mounted in said slots have interconnections which program said slots to distribute power in predetermined manner.

7. A fractional horse power motor having a field winding mounted on a molded plastic bobbin, said plastic bobbin having an integral end flange on at least one end thereof for retaining said winding, said at least one flange being molded in a shape to provide a plurality of plug-in contact sites along an exposed surface of said flange, and electrical socket contacts associated with at least some of said contact sites for receiving complementary plug contacts which may be plugged into or removed from said socket contacts, said winding being connected to at least one of said electrical socket contacts, and means for interconnecting said electrical socket contacts in a manner which programs electrical connections, thereby enabling said flange to become a power distribution panel for receiving said complementary plug contacts.

8. The motor of claim 7 wherein at least some of said contacts are programmed to be connected to a power line and other of said contacts are programmed to connect a switch to said power line.

9. The motor of claim 8 wherein said interconnection of said contacts makes said switch control the operation of said motor.

10. The motor of claim 8 and at least one accessory associated with said motor and said interconnection of said contacts is programmed to supply power to said accessory when it is plugged into said contacts.

11. The motor of claim 10 wherein said accessory is taken from a group consisting of a pilot lamp, heating element, electronic display, microprocessor, timer, and surge protector.

\* \* \* \* \*